United States Patent
Baumstimler et al.

(10) Patent No.: US 8,025,143 B2
(45) Date of Patent: Sep. 27, 2011

(54) BOTTLE DISTRIBUTION TABLE AT THE ENTRY TO SINGLE FILE CHANNELS

(75) Inventors: Gilles Baumstimler, Octeville sur Mer (FR); Marcel Ludwig, Octeville sur Mer (FR)

(73) Assignee: Sidel Participations, Octeville Sur Mer (FR)

( * ) Notice: Subject to any disclaimer, the term of this patent is extended or adjusted under 35 U.S.C. 154(b) by 365 days.

(21) Appl. No.: 12/446,876

(22) PCT Filed: Oct. 23, 2007

(86) PCT No.: PCT/FR2007/001743
§ 371 (c)(1),
(2), (4) Date: Apr. 23, 2009

(87) PCT Pub. No.: WO2008/056046
PCT Pub. Date: May 15, 2008

(65) Prior Publication Data
US 2009/0229952 A1  Sep. 17, 2009

(30) Foreign Application Priority Data
Oct. 24, 2006 (FR) .................... 06 09287

(51) Int. Cl.
*B65G 27/00* (2006.01)
(52) U.S. Cl. .................. 198/446; 198/453
(58) Field of Classification Search .......... 198/443, 198/445, 446, 452, 453
See application file for complete search history.

(56) References Cited

U.S. PATENT DOCUMENTS

| | | | |
|---|---|---|---|
| 2,941,650 A | | 6/1960 | Clinton |
| 3,710,918 A | * | 1/1973 | Babunovic .................... 198/445 |
| 3,874,494 A | * | 4/1975 | Temming ...................... 198/446 |
| 4,060,166 A | * | 11/1977 | Hartness et al. .............. 198/446 |
| 4,173,276 A | | 11/1979 | Raudat et al. |
| 4,276,977 A | * | 7/1981 | van Kattenbroek ........... 198/446 |
| 4,932,514 A | * | 6/1990 | Doppenberg .................. 198/445 |
| 4,966,272 A | * | 10/1990 | Raudat .......................... 198/446 |
| 5,038,917 A | | 8/1991 | Kronseder |
| 5,228,550 A | * | 7/1993 | Munch ........................... 198/447 |
| 5,235,996 A | * | 8/1993 | Beswick ....................... 134/125 |
| 5,760,343 A | * | 6/1998 | Arimoto et al. ............. 177/25.18 |
| 6,000,527 A | * | 12/1999 | Layne ............................ 198/446 |

(Continued)

FOREIGN PATENT DOCUMENTS

EP  1 038 808 A1  9/2000

(Continued)

*Primary Examiner* — Joseph A Dillon, Jr.
(74) *Attorney, Agent, or Firm* — Sughrue Mion, PLLC

(57) ABSTRACT

The distribution table (3) is arranged downstream of an introduction table (2) and upstream of single file channels (12) and comprises an entry zone (10) which is provided at the sides with sensors (17) which detect the presence of bottles and connected to control means for controlling and regulating the introduction flow of said bottles at said entry zone (10) and also between said entry zone (10) and the single file channels (12) and distribution channels (11) of transverse alignment the number of which corresponds to half the number of single file channels (12). The distance separating channels (11) from the channels (12) is of the order of one quarter of the diameter of the bottles. The distribution channels (11) are defined by longitudinal walls (21) supported by a mobile structure (15), said structure being moved in a continuous circular sweep of low amplitude in front of said single file channels (12).

8 Claims, 3 Drawing Sheets

U.S. PATENT DOCUMENTS

| | | |
|---|---|---|
| 7,055,670 B2 | 6/2006 | Florczak et al. |
| 7,073,656 B2 * | 7/2006 | Gust et al. .................. 198/453 |
| 7,128,217 B2 * | 10/2006 | Henry ........................ 209/643 |
| 2005/0061617 A1 | 3/2005 | Florczak et al. |
| 2006/0131132 A1 | 6/2006 | Heuft et al. |

FOREIGN PATENT DOCUMENTS

| | | |
|---|---|---|
| EP | 1 508 540 A2 | 2/2005 |
| FR | 1.359.601 A | 3/1964 |
| FR | 2 650 806 A1 | 2/1991 |
| FR | 2 667 851 A2 | 4/1992 |

* cited by examiner

BOTTLE DISTRIBUTION TABLE AT THE ENTRY TO SINGLE FILE CHANNELS

FIELD OF THE INVENTION

This invention relates to systems for conveying bottles, cans or the like, and in particular, a distribution table.

DESCRIPTION OF THE PRIOR ART

This distribution table is interposed between the upstream table for introducing bottles, on which they are arranged in bulk, and the downstream table where the bottles are channeled in single file, for management thereof.

Document EP 1 038 808 proposes a device that enables the bottles arriving in bulk on a conveyor to be divided and distributed.

The flow of bottles is channeled over a plurality of segments of the conveyor:
- an inlet segment that simply comprises lateral guides between which the bottles are in dispersed order, in bulk;
- a final segment that comprises, in addition to lateral guides, subdivision guides for defining four single-file end of line channels;
- an intermediate segment that comprises lateral guides and that is also subdivided by means of a central guide in order to form two channels of which the width corresponds substantially to twice the diameter of the bottles.

To remove congestion from the inlet of the intermediate segment, a flap is arranged upstream of the central guide. This flap resembles a "flipper"; it is mobile about a vertical pivot shaft arranged at its rear end; in addition, it is longitudinally mobile, i.e. it can move backward, with the intermediate guide, in order to de-compact the flow when there is congestion and then return to its position.

The backward movement of the flap precedes its pivoting movement in order first to cause a de-compacting of the bottle flow, and then the pivoting enables said bottles to be routed toward one or the other of the single-file channels.

A device for detecting an interruption in the bottle flow is located upstream of the single-file channels, at the level of the intermediate segments.

This detection device is associated with flap control means, enabling the de-compacting of the bottles to be performed only when necessary.

Other flaps can also be arranged upstream of the dividing guides of two adjacent single-file channels, in their alignment. These complementary flaps are implemented in the same way, i.e. after detecting an interruption in the flow of bottles in the final segment.

The upstream flap, arranged at the inlet of the intermediate segment, has its own implementation system, and this implementation system is independent of that of any flaps arranged downstream, at the inlet of the single-file channels. In such a system, there is a multiplication of means for detecting bottle flows and flap maneuvering mechanisms.

Moreover, the flap(s) are actuated only after the fact, if an interruption in the bottle flow is detected; they can also be actuated inappropriately if there is simply a decrease in the flow with free spaces between the bottles.

In addition, this detection of an interruption in the flow has no influence on the influx of bottles in front of the flap(s); it simply manages congestion problems at the inlet of the passages in a piecemeal manner, without any anticipation.

In this aforementioned document, as in other documents such as patents US 2006/0131132 and U.S. Pat. No. 4,173,276, it is noted that the walls of the channels located downstream penetrate the stream of arriving bottles and that these walls form an arrow or fir tree-shaped protrusion.

In the two US documents cited above, it is the portions located upstream of the channels that are subjected to an agitation movement in order to attempt to unblock the bottles and move them into each single-file channel, and, also in these documents, the width of the upstream channel from which the bottles arrive is clearly smaller than the total width of the single-file channels. It is also noted, in document US 2006/0131132, that the lateral channels of the apparatus comprise lateral walls that are independent of the agitation structure.

SUMMARY OF THE INVENTION

This invention proposes a distribution table that enables a rapid and effective division of a flow of bottles to be performed, regardless of its width and regardless of the number of single-file channels to be used.

This distribution table has the advantage of better controlling the bottle flow and harmonizing their distribution into the single-file end of line channels; in addition, it works continuously to prevent bottle congestion at the inlets of the various channels, without waiting for a blockage.

This table has the special feature of being compact, and it can be integrated, as a module, in an existing installation, between the introduction table and the so-called constantly filled grouping table.

According to the invention, the distribution table is arranged downstream of a bottle introduction table equipped with conveyors, and it comprises a continuous conveyor belt, which belt includes:
- an inlet zone that is equipped, laterally, with guides, and, at the level of said guides, detection means in the form of sensors that are sensitive to the presence and in particular to the pressure of bottles against these lateral guides, which sensors are associated with control means for controlling and adjusting the incoming flow of bottles, at the level of said inlet zone, by acting on said conveyors of the introduction table,
- and, between said inlet zone and the single-file channels, a zone consisting of a plurality of distribution channels that are aligned transversally and of which the number corresponds to around half of the number of single-file channels, which distribution channels are defined by longitudinal walls, parallel to one another, which walls are arranged opposite corresponding walls of said single-file channels and are supported by a mobile structure that imparts, on said distribution channels, a continuous circular sweeping movement, of low amplitude, in front of said single-file channels and in particular in front of the walls of the latter, which walls are aligned transversally, just like the downstream portion of the walls of said distribution channels, and the average distance between said walls is on the order of one-quarter of the diameter of the bottles.

According to another provision of the invention, the walls of the distribution channels have a length that corresponds to two or three times the diameter of the bottles, for example.

Also according to the invention, the upstream and downstream edges of the walls of the distribution channels are equipped with roller-type bearings, of which the diameter is on the order of 10 to 12 mm, and these rollers are, for example, distributed over a height matching the size of the bottles.

According to another provision of the invention, the upstream edge of each wall of the single-file channels comprises, in the same way, roller-type bearings identical to those used on the walls of the distribution channels.

Also according to the invention, the structure supporting the walls of the distribution channels is in the form of a frame that is itself supported and guided by suitable means for performing the continuous circular sweeping movement, by means of a drive member.

According to another provision of the invention, the means that enable a continuous circular sweeping movement to be imparted on the supporting structure of the distribution walls consist of two slide systems secured to the chassis, of which one is arranged in the direction of forward movement of the bottles and the other is arranged in a transverse direction, perpendicular to the former.

Also according to the invention, the continuous circular sweeping movement of the supporting structure of the distribution walls is performed by means of a drive member of the motor reducer type and an eccentric member, which eccentric member includes, for example, a crankshaft of which the length is adjustable in order to adjust the amplitude of sweeping of the distribution walls to the format of the bottles, which length is on the order of 10 to 12 mm.

The invention also relates to the installation that includes a distribution table as described earlier and in particular a distribution table that is integrated between the upstream table where the introduction of the bottles is performed and the downstream table that comprises the single-file channels, in which said single-file channels extend in cantilevered form over said distribution table.

BRIEF DESCRIPTION OF THE DRAWINGS

The invention will be described in further detail in the following description with the appended drawings, given for indicative purposes, in which.

DETAILED DESCRIPTION OF THE INVENTION

The installation according to the invention works for glass or plastic bottles, or for metal cans, for example; it is suitable for all types of containers, flasks, and so on.

Figure 1:
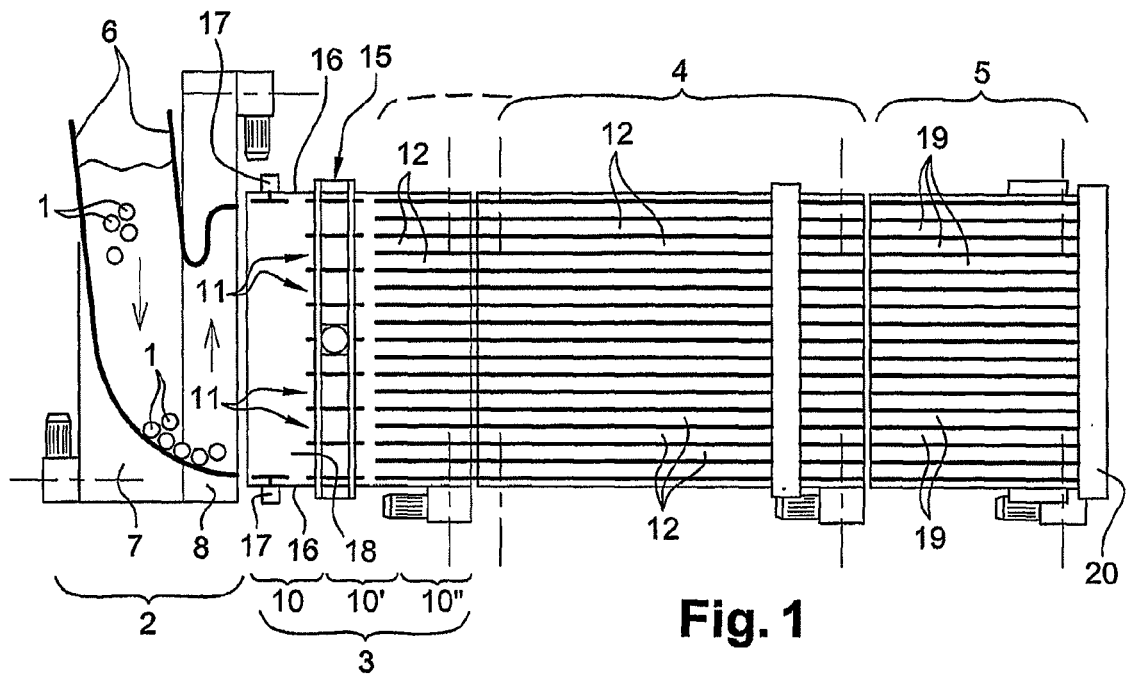
FIG. 1 is a diagrammatic top view of an installation comprising the conveyor device according to the invention.

The installation shown in FIG. 1 includes a plurality of tables equipped with distinct conveyors for moving the bottles (1).

It includes an introduction table (2), where the bottles arrive (1); a table (3) for distributing bottle flows, which corresponds specifically to the invention; a table (4) where the collecting and grouping of the bottles (1) is performed, commonly called an always full table (4), and, finally an end of line table (5) where the batches of bottles (1) are managed by suitable manipulation head-type means, not shown.

The table (2) for introduction the bottles (1) is perpendicular to the other tables (3, 4, 5), which follow one another on the same line.

This table (2) conventionally comprises a channel that is defined by guides (6), in which said bottles (1) are moved by means of a conveyor (7), then, before they leave said table (2), these same bottles are moved, in a direction opposite that of their arrival, by means of another conveyor (8) that is joined parallel to said conveyor (7).

The table (3) for distributing flows of bottles (1) also comprises a plurality of zones:
a first zone (10) that constitutes the inlet, in the form of a portico for receiving the bottles (1);
a second zone (10') that comprises a plurality of channels (11) for distributing said bottles (1), which channels are arranged in lines, transversally with respect to the direction of forward movement of the bottles on said table (3);
a third zone (10") that comprises the single-file channels (12), which channels (12) are in fact an extension, in cantilevered form, of the channels of the next table (4).

The number of distribution channels (11) is a fraction of the number of single-file channels (12); these channels (11) have a width that is substantially twice that of the single-file channels (12).

These channels (11) are supported by a mobile structure (15), which will be described in detail below in reference to FIGS. 5 and 6.

The inlet (10) of the table (3) comprises lateral guides (16) at the level of which detection means are arranged in the form of sensors (17). These sensors (17) are intended to detect the presence of bottles (1) on the right bank and on the left bank of said table (3) and, by means of suitable control means, actuate the on-off system of the conveyors (7) and (8) in order to equalize the arrival of said bottles on said inlet (10).

In general, these detection means enable the flow of bottles (1) to be managed and spread at the inlet (10) of the distribution table (3). This management is also provided with the assistance of the belt (18) of the conveyor of the distribution table (3); this belt (18) moves forward continuously, unlike those of the conveyors (7) and (8) of which the movement is controlled by the sensors (17).

The always full table (4) is a relatively conventional table; it is on this table that the bottles are collected in single-file channels (12) before leaving, in batches, on the end of line table (5).

The end of line table (5) is also a conventional table; this table comprises channels (19) that are arranged in alignment with the channels (12) of the preceding table (4). At the end of these channels (19) is the structure (20) with the decompression stops.

The distribution channels (11) are intended to harmonize the filling of the single-file channels (12). These channels (11) are supported by the mobile structure (15). This structure (15) is driven by a continuous low-amplitude circular sweeping movement in order to move the bottles on the belt (18) of the table (3), which belt (18) also moves forward continuously.

This sweeping movement enables the flow of bottles to be decompressed and blockages to be eliminated; it causes the bottles to leave in one direction or the other according to their position opposite an inlet of the single-file channels (12) and also according to the filling of said single-file channels (12).

Figure 2:
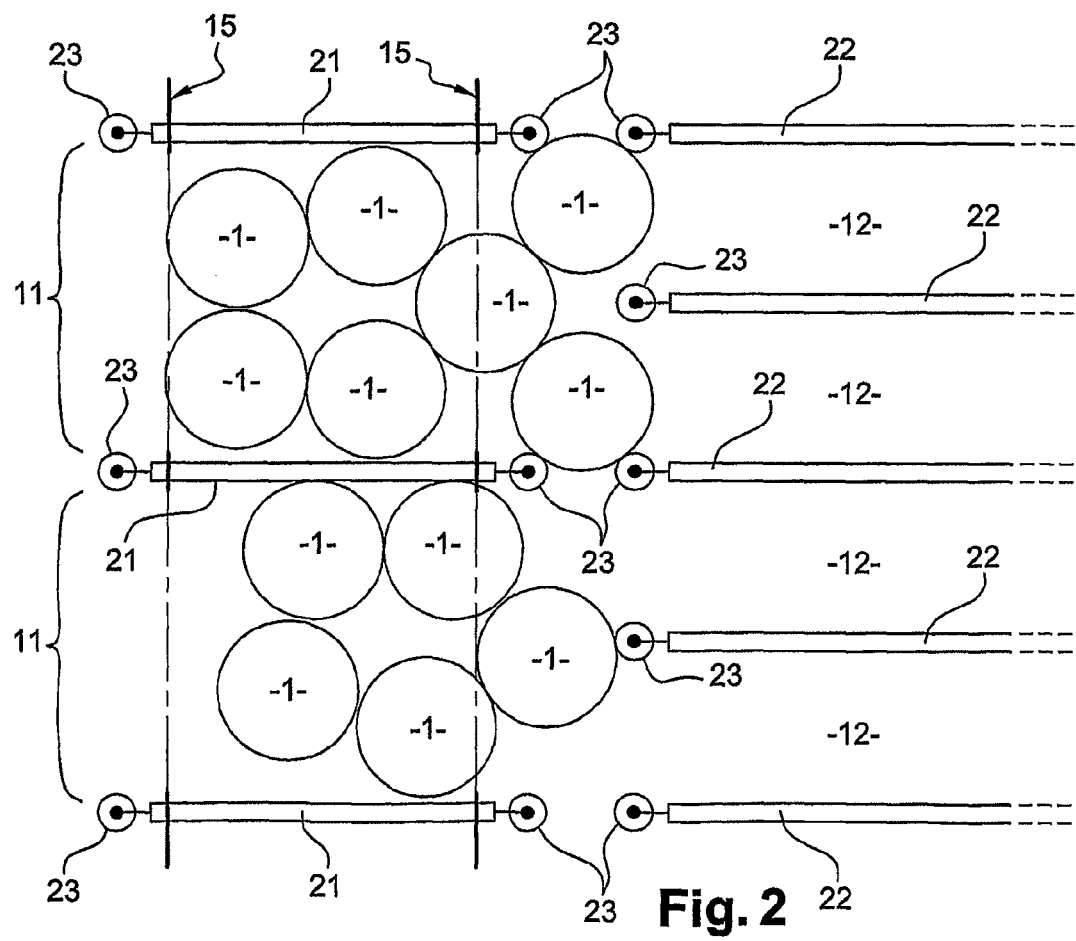
FIG. 2 is a more detailed view of single-file channels and distribution channels.

FIG. 2 shows, in greater detail, distribution channels (11) arranged opposite single-file channels (12), with bottles (1) in diverse and varied positions.

The distribution channels (11) are defined by mutually parallel walls (21), which are supported by the structure (15). These walls (21) have a length on the order of two to three times the diameter of the bottles (1) for example.

The single-file channels (12), in which the bottles (1) are stored, are defined by mutually parallel walls (22), which walls (22), as indicated above, are secured to the table (4) and they advance, in cantilevered form, on the downstream portion of the distribution table (3), just behind the channels (11).

The width of the distribution channels (11) is on the order of twice the diameter of the bottles (1). The walls (21) of the distribution channels (11) are located, when they are in the median position, in the alignment of the corresponding walls (22) of the single-file channels (12).

The upstream and downstream ends of the walls (21) are aligned transversally and they comprise roller-type bearings (23), like the upstream end of the walls (22) of the single-file channels (12).

Figure 3:
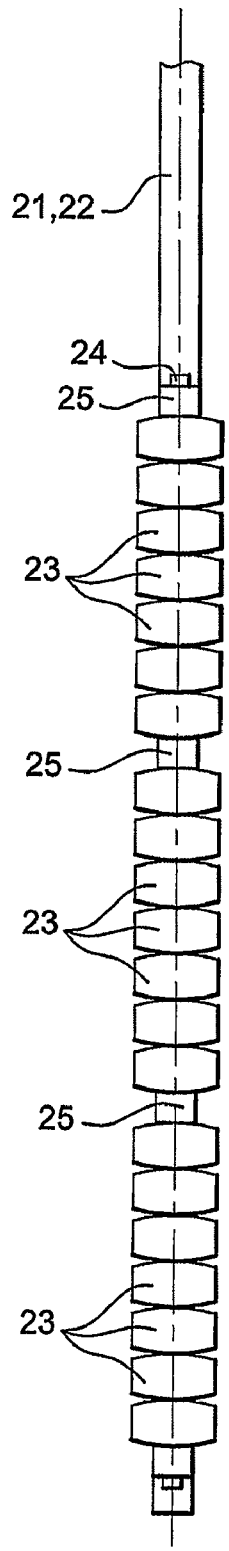
FIG. 3 shows the arrangement of rollers on the inlet and outlet edge of the channels.

These rollers (23) have a diameter on the order of 10 to 12 mm, and are arranged, as shown in FIG. 3, on a shaft (24). According to the shape of the bottles, these rollers (23) can be distributed in a plurality of groups, between anchorings (25) of the shaft (24).

Figure 4:
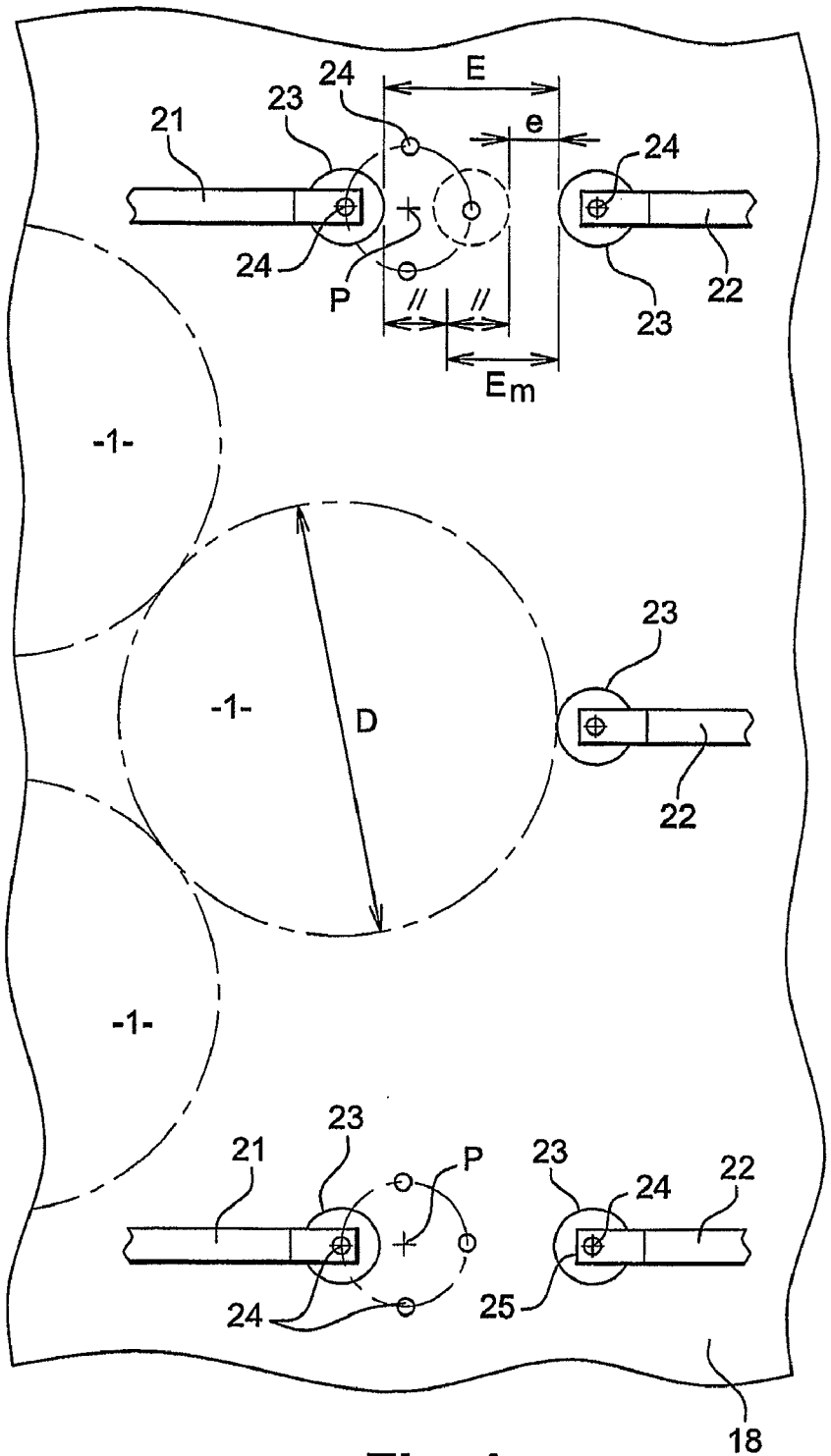
FIG. 4 shows, in even greater detail, in a top view, the arrangement of the ends of the walls of the distribution channels and the walls of the single-file channels.

FIG. 4 shows, also in greater detail, the area of interaction of the distribution channels (11) with the inlet of the single-file channels (12).

The walls (21) of the distribution channels (11) are driven by a continuous circular sweeping movement, from right to left and from front to back, like the movement of a rod that connects two wheels rotating at the same speed.

The amplitude of this movement is on the order of 10 to 12 mm around a stationary point, such as point P which simulates the center of the circumference covered by the shaft (24) of the rollers (23) located at the downstream end of the wall (21).

The space between the rollers (23) of the downstream end of the walls (21) and the rollers of the upstream end of the walls (22) concerned changes between a maximum value E to a minimum value e. The minimum value Em of this space between the rollers (23) is on the order of one-quarter of the diameter D of the bottles (1).

Figure 5:
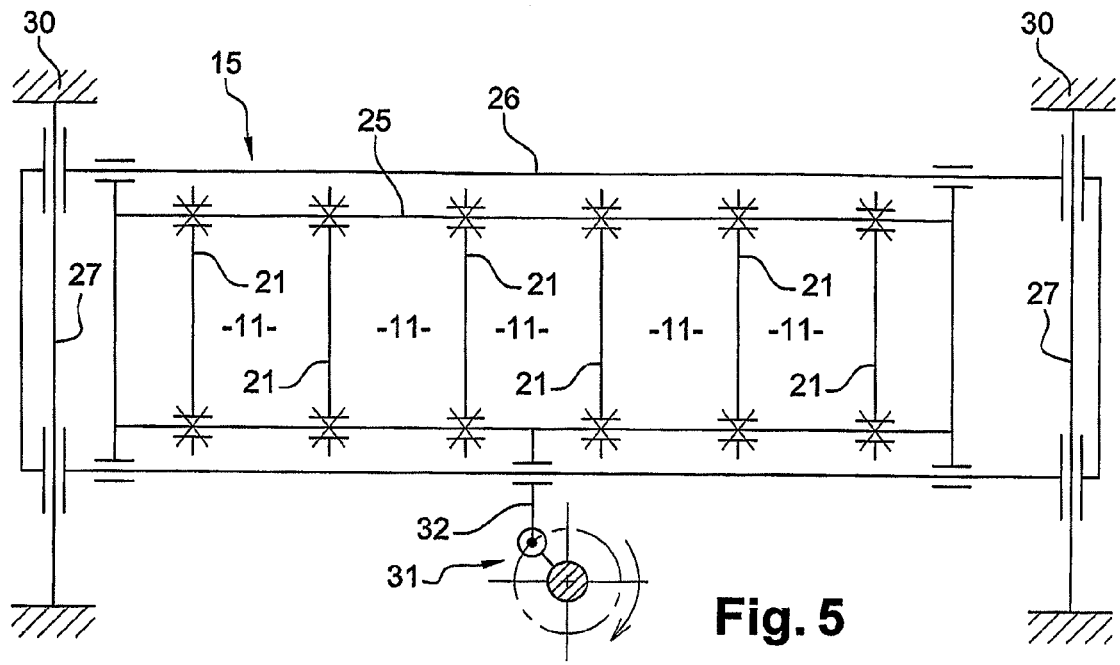
FIG. 5 diagrammatically shows, in a top view, the supporting structure of the walls of the distribution channels.
Figure 6:
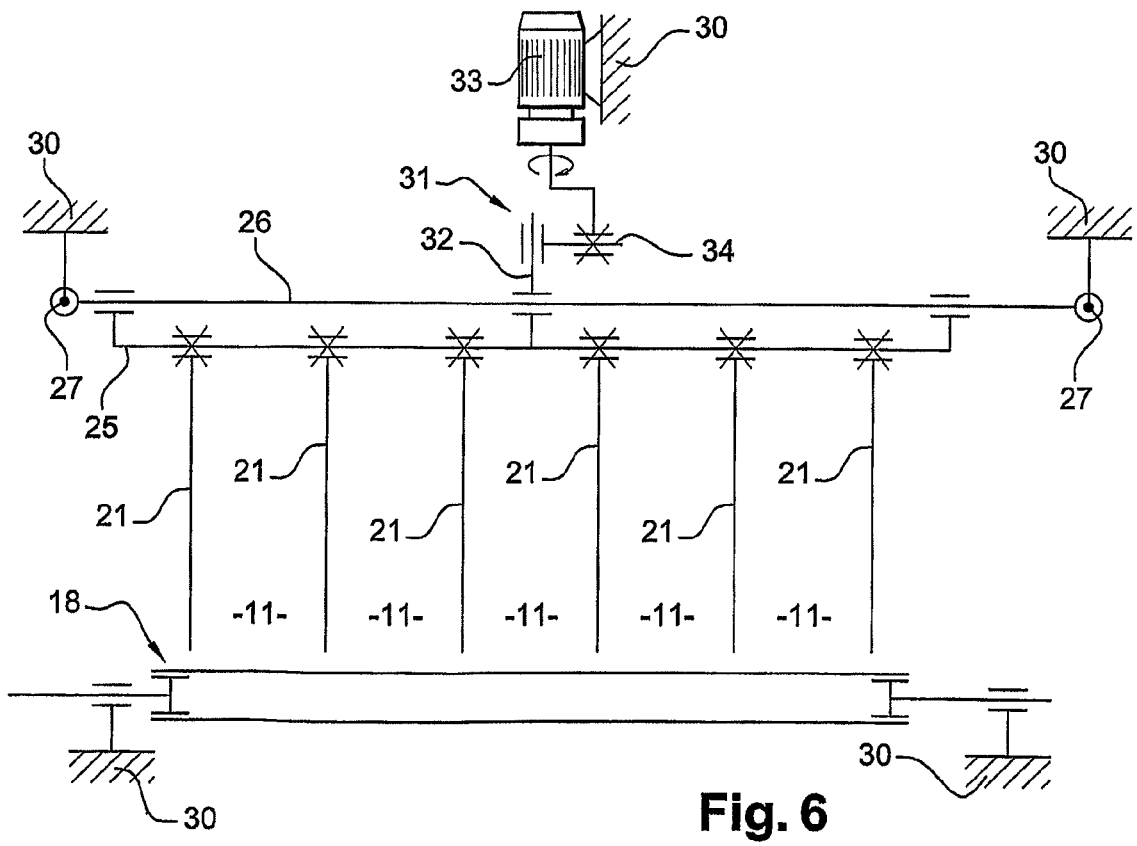
FIG. 6 diagrammatically shows, in a frontal view, the supporting structure of the walls of the distribution channels.

In order to perform this sweeping movement, the walls (21) are supported by a structure (15) that is detailed in FIGS. 5 and 6.

This structure (15) includes a frame (25) to which all of the walls (21) are attached in their upper portion. These walls (21) can be attached by adjustable means in order to enable the width of the distribution channels (11) to be varied as desired if the single-file channels (12) also have an adjustable width in order to adapt to various bottle (1) formats.

The frame (25) is transversally mobile over a second frame (26), which frame (26) is arranged with slides, and is itself longitudinally mobile on slides (27) that are secured to the chassis (30) of the distribution table (3).

The movement of the frame (25) that supports the walls (21) is achieved by means of an eccentric member (31), which eccentric member (31) drives the arm (32) of said frame (25) in a circular movement, which frame (25) moves transversally on the frame (26), and drives said frame (26), which moves longitudinally on the slides (27). The continuous circular sweeping movement of the walls (21) that form the various distribution channels (11) is thus obtained.

The movement is transmitted to the walls (21) by a drive member (33), of the motor reducer type, which is arranged above the structure (15) supporting said walls (21), in which said structure is secured to the chassis (30). This movement can also be imparted by something other than a simple eccentric member (31). It can be imparted by a cam, not shown, of which the profile can be elliptical or the like.

In FIG. 6, shown to the side, the eccentric (31) is in the form of a connecting rod (34) of adjustable length; this length is adjustable in order to modify the amplitude of the sweeping according to the type of bottles.

The sweeping is performed above the conveyor belt (18), in a horizontal plane parallel to said belt (18). This belt (18) can be seen in FIG. 6; it is supported and guided by the chassis (30) of the distribution table (3).

The invention also relates to the installation that includes this distribution table (3) and in particular this table (3) which is integrated between the table (2) for introducing bottles and the table (4) of which the channels (22) extend in cantilevered form over said distribution table (3).

The invention claimed is:

1. Table for distributing bottles at the inlet of single-file channels, which distribution table is arranged downstream of a table having conveyers for introducing said bottles wherein said distribution table comprises a continuous conveyor belt, supported and guided by the chassis of said distribution table, which belt includes:

an inlet zone that is equipped, laterally, with guides, and, at the level of said guides, detection means in the form of sensors that are sensitive to the presence of bottles, which sensors are associated with control means for controlling and adjusting the incoming flow of bottles, at the level of said inlet zone, by acting on said conveyors, and, between said inlet zone and the single-file channels, a zone consisting of a plurality of distribution channels that are aligned transversally and of which the number corresponds to around half of the number of single-file channels, which distribution channels are defined by longitudinal walls, parallel to one another, which walls are arranged opposite corresponding walls of said single-file channels and are supported by a mobile structure, secured to said chassis, which imparts, on said distribution channels, a continuous circular sweeping movement, of low amplitude, in front of said single-file channels and in front said walls of the single-file channels, which walls are oriented like the downstream portion of said walls of the distribution channels, and the distance Em between these walls, is substantially on the order of one-quarter of the diameter D of the bottles.

2. Distribution table according to claim 1, wherein the walls of the distribution channels have a length that corresponds to two or three times the diameter of said bottles.

3. Distribution table according to claim 1, wherein the upstream and downstream edges of the walls of the distribution channels are equipped with roller-type bearings, of which the diameter is on the order of 10 to 12 mm.

4. Distribution table according to claim 3, wherein the upstream edge of each wall of said single-file channels comprises, in the same way, roller-type bearings identical to those used on the walls of the distribution channels.

5. Distribution table according to claim 1, wherein the structure supporting the walls of the distribution channels is in the form of a frame that is itself supported and guided by suitable means for performing the continuous circular sweeping movement, by means of a drive member.

6. Distribution table according to claim 5, wherein the guide means of the structure consist of two slide systems secured to the chassis, of which one is arranged in the direction of forward movement of the bottles and the other is arranged in a transverse direction, perpendicular to the former.

7. Distribution table according to claim 6, wherein the continuous circular sweeping movement of the structure is performed by means of an eccentric member driven by a drive member, which eccentric member comprises a crankshaft of variable length on the order of 10 to 12 mm.

8. Boxing installation wherein it includes a distribution table according to claim 1, which distribution table is integrated between a table for introducing bottles and a downstream table that comprises the single-file channels, which single-file channels extend in cantilevered form over said distribution table.

* * * * *